United States Patent [19]

Matsuoka et al.

[11] 4,449,040

[45] May 15, 1984

[54] IDENTIFICATION CODE DETERMINING APPARATUS FOR USE IN TRANSACTION PROCESSING APPARATUS

[75] Inventors: Akira Matsuoka, Takatsuki; Terukazu Tsukagoshi, Otokuni, both of Japan

[73] Assignee: Omron Tateisi Electronics Co., Kyoto, Japan

[21] Appl. No.: 328,133

[22] Filed: Dec. 7, 1981

[30] Foreign Application Priority Data

Dec. 6, 1980 [JP] Japan .................................. 55-172480

[51] Int. Cl.³ ............................................. G06K 7/10
[52] U.S. Cl. ........................................ 235/380; 235/381; 235/379; 340/825.32; 340/825.34; 340/825.36; 194/DIG. 26
[58] Field of Search ................. 235/380, 379, 381, 382; 340/825.34, 825.32, 825.36; 194/DIG. 26

[56] References Cited

U.S. PATENT DOCUMENTS

| | | | |
|---|---|---|---|
| 3,697,729 | 10/1972 | Edwards et al. | 235/381 |
| 3,845,277 | 10/1974 | Voss et al. | 235/379 |
| 3,866,173 | 2/1975 | Moorman | 340/149 A |
| 4,092,524 | 5/1978 | Moreno | 235/419 |

Primary Examiner—A. D. Pellinen
Assistant Examiner—Robert Lev
Attorney, Agent, or Firm—Schwartz, Jeffery, Schwaab, Mack, Blumenthal & Koch

[57] ABSTRACT

A transaction processing apparatus permits transaction processing when using a record medium in which customer identifying information is recorded and an identification code entered by a customer is valid. Determination of validity of an identification code is made when a correct identification code is entered while less than a predetermined number of erroneous entries are made, or when a correct identification code is entered within a predetermined time in the case of erroneous entries in excess of the predetermined number. In case that an erroneous entry is again made after more than the predetermined number of erroneous entries the predetermined time period during which it is permitted to determine validity of the entered identification code is increased to a longer time period as the number of erroneous entries increases. In addition, in case that the number of unconditionally acceptable erroneous entries exceeds a relatively large number of times, the record medium is registered as an invalid card.

9 Claims, 9 Drawing Figures

| CUSTOMER CODE (311) | CURRENT TIME (312) | NUMBER OF TIMES (313) | 31 |
|---|---|---|---|
| PREDETERMINED TIME PERIOD STORAGE REGION ||| 32 |
| PREDETERMINED NUMBER OF TIMES STORAGE REGION ||| 33 |
| CUSTOMER CODE | DATE, HOUR, MINUTE | NUMBER OF TIMES | 341 |
| " | " | " | 342 |
| " | " | " | 343 |
| ⋮ | ⋮ | ⋮ | ⋮ |
| 34a | 34b | 34c | |

| CUSTOMER CODE (311) | NUMBER OF TIMES (314) | ACCUMULATION (315) | REMOVED DATE AND HOUR (316) | 31 |
|---|---|---|---|---|
| PREDETERMINED NUMBER OF TIMES STORAGE REGION |||| 35 |
| INHIBITING TIME PERIOD STORAGE REGION |||| 36 |
| CUSTOMER CODE | NUMBER OF TIMES | ACCUMULATION | REMOVED DATE AND HOUR | 341 |
| " | " | " | " | 342 |
| " | " | " | " | 343 |
| ⋮ | ⋮ | ⋮ | ⋮ | ⋮ |
| 34a | 34d | 34e | 34f | |

| CUSTOMER CODE /311 | CURRENT TIME /312 | NUMBER OF TIMES /313 | /31 |
|---|---|---|---|
| PREDETERMINED TIME PERIOD STORAGE REGION ||| /32 |
| PREDETERMINED NUMBER OF TIME STORAGE REGION ||| /33 |

| TABLE | CUSTOMER CODE | DATE, HOUR, MINUTE | NUMBER OF TIMES | /341 /342 /343 } 34 |
|---|---|---|---|---|
| | " | " | " | |
| | " | " | " | |
| | ⋮ 34a | ⋮ 34b | ⋮ 34c | |

| PERMISSIBLE NUMBER OF ERRONEOUS ENTRY TIMES STORAGE REGION | /37 |
|---|---|

| TABLE | CUSTOMER CODE OF INVALIDATED CARD | } 38 |
|---|---|---|
| | " | |
| | " | |
| | ⋮ | |

FIG. 9

IDENTIFICATION CODE DETERMINING APPARATUS FOR USE IN TRANSACTION PROCESSING APPARATUS

BACKGROUND OF THE INVENTION

1. Field of the Invention

The present invention relates to an identification code determining apparatus for use in a transaction processing apparatus. More particularly, the present invention relates to an identification code determining apparatus which provides an improved manner of determining validity of an identification code entered by a customer in a transaction processing apparatus for making a transaction which is processing by using a record medium storing customer identifying information such as the identification code.

2. Description of the Prior Art

Generally, a transaction processing apparatus has been proposed to perform different kinds of transaction processings by using a record medium, such as a magnetic card, in which identifying information is recorded. Examples of such transaction processing includes automatic cash dispensers, electronic cash registers capable of settling accounts by credit cards, POS (point of sale) system used in gas stations which can supply gas by using a magnetic card, and the like. In case that a transaction is made in such transaction processing apparatus the customer must present a magnetically encoded card at the time of the transaction and enter an identification code, which is known by only the customer.

In a conventional transaction processing apparatus, in case that the identification code is erroneously entered a predetermined number of times, for example three times, the magnetic card is retained in the apparatus or returned to the customer without any processing, and thereafter further entry of identification code is prohibited.

However, a transaction processing apparatus of the type which retains the magnetic card therein when the number of erroneous entries of the identification code reaches a predetermined number has a drawback in that authorized personnel must determine the validity of the magnetic card and returns same to the user if the user is the proper owner of the magnetic card. The processing by a clerk in charge is complicated and thus the customer must be kept waiting for a longer time. Further, in the another type of a transaction processing apparatus wherein the magnetic card is returned to the customer when erroneous entries of the identification code are repeated a predetermined number of times, there is a problem in that since the magnetic card is returned to the user even if the card is stolen card, an unauthorized person using the stolen card tries to repeat entry of identification code many times so as to find out a correct identification code.

SUMMARY OF THE INVENTION

Briefly described, the present invention is adapted to permit erroneous entries of an identification code (secret number) a first predetermined number of times and return a record medium if a correct identification code is entered before the number of erroneous entries reaches the first predetermined number. Unless a predetermined time period from the time point of the last erroneous entry passes, determination of the identification code is inhibited even if the user enters the correct identification code. Then, if and when a correct identification code is entered after the predetermined time period has passed, determination of identification code is made and a transaction processing is permitted.

In accordance with the present invention, if and when an identification code is erroneously entered, a customer has sufficient time to confirm his correct identification code and thus, the post processing is easily and quickly made even if a predetermined number of erroneous entries occur. Therefore, one can prevent transaction processing using stolen cards.

In a preferred embodiment of the present invention, determination of validity of the identification code is permitted if the number of erroneous entries of the identification code does not exceed a predetermined number of times, and the time period of prohibiting the determination of validity of the identification code is made longer as the number of erroneous entries increases after the number of erroneous entries exceeds the predetermined number, whereby unfair transaction processing by using another's record medium can be prevented.

In another preferred embodiment of the present invention, the number of entries of identification code is accumulated and if and when the accumulated number of entries exceeds a second predetermined number of erroneous entries, larger than the first predetermined number the corresponding record medium is determined to be invalid, whereby further transaction processing is prohibited.

Accordingly, a principal object of the present invention is to provide an identification code determining apparatus for use in a transaction processing apparatus, wherein a customer can have sufficient time to confirm his identification code upon erroneous entry of an identification code and the post processing can be easily and quickly made even if a predetermined number of erroneous entries occur. If the record medium is stolen, the inhibit time period gives the customer time to report the stolen card thereby preventing unfair use of the record medium.

One aspect of the present invention is to permit a relatively quick transaction processing when a correct identification code is entered after more than a predetermined time of erroneous entries occurs. Further, an aspect of the invention is to make the inhibit time period starting from the point of time of the erroneous entry progressively longer in proportion to the number of erroneous entries.

Another aspect of the present invention is to regard a record medium as invalid if and when the number of erroneous entries exceeds a relatively large number and to register a customer code of the record medium as invalid thereby to prohibit a further transaction processing by using the record medium determined to be invalid.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
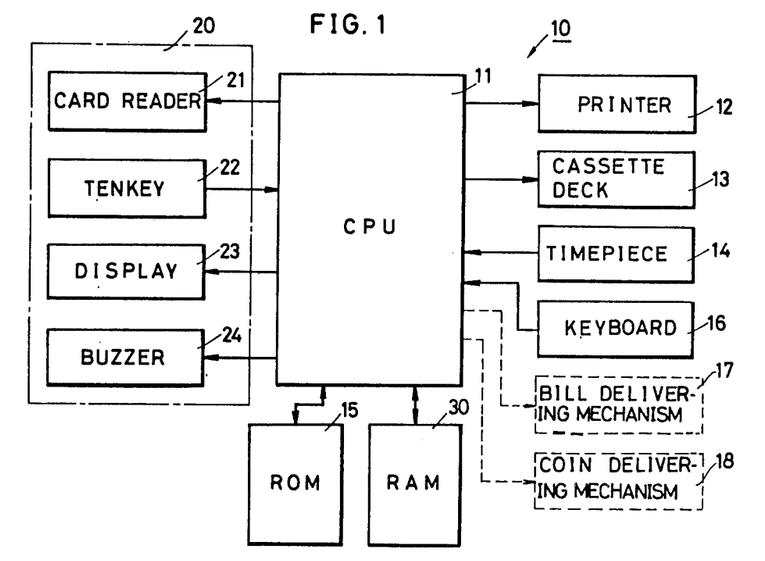
FIG. 1 is a block diagram of a transaction processing apparatus of one embodiment of the present invention.

FIG. 1 is a block diagram of a POS system for use in a gas station as an example of a transaction processing apparatus of an embodiment of the present invention. In the construction, a transaction processing apparatus 10 used for a POS system for use in a gas station includes a central processing unit (CPU) 11 such as a microprocessor or a microcomputer. A customer operating portion 20 shown in FIG. 2 as described subsequently is connected to the CPU 11. The customer operating portion 20 includes a card reader 21, a ten key keyboard 22 for entering an identification code, a display 23 and a buzzer 24. To the CPU 11 are connected a printer 12, a cassette deck 13, a timepiece 14 and a keyboard 16. The printer 12 is used for printing and recording a transaction processing data of a gas supply and the like to issue a receipt thereof. The cassette deck 13 is used for collecting and recording the processed data in a magnetic tape, in case that the processing unit 11 is not coupled to a central processing unit in a central office in an on-line manner, that is, in case of an off-line mode. A timepiece circuit 14 shows current time. The keyboard 16 is used for entering information other than the identification code. In addition, to the CPU 11 are connected a memory (read only memory; ROM) 15 for storing a program as shown in FIG. 4 described subsequently and a memory (random access memory; RAM) 30 for temporarily storing the processed data as subsequently explained in detail referring to FIG. 3.

Figure 2:
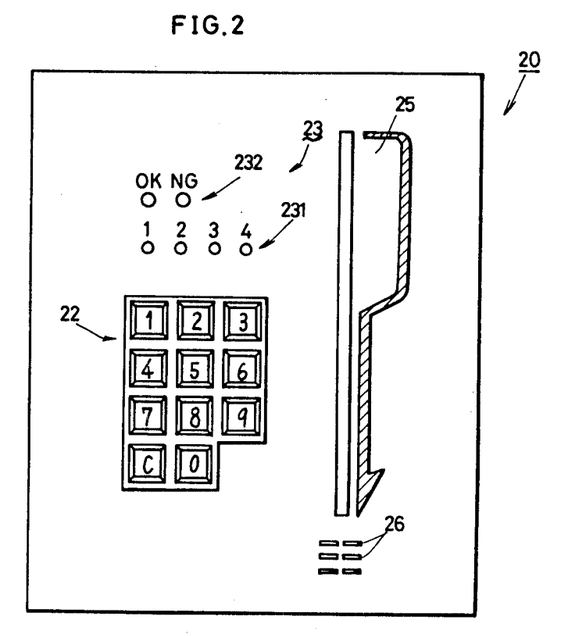
FIG. 2 is a schematic diagram of a customer operating portion 20 shown in FIG. 1.

FIG. 2 is a schematic diagram of said customer operating portion 20. The panel of the customer operating portion 20 is provided with a card inserting slot 25. The card reader 21 is provided at the rear side of said card inserting slot 25. When a magnetic card is manually scanned, the card reader 21 reads the data magnetically recorded in the magnetic card. The card reader 21 may be of a type of automatically scanning the magnetic card. A customer code, an issuance place code indicating the place where the magnetic card is issued and an effective date data and the like are magnetically recorded in the magnetic card. In addition, an identification code may be recorded in the magnetic card, as necessary. If and when the identification code is evaluated by reading the customer code from such a magnetic card, a number of four figures is evaluated based on a well-known equation for evaluating an identification code. There are many methods known, for example, a method for evaluating the identification code by operating and processing an adequate arithmetic expression and a customer code and for determining coincidence of the evaluated identification code with an entered identification code; a method for evaluating a customer code by operating and processing an adequate arithmetic expression and an identification code and for determining coincidence of the evaluated customer code with a customer code read out of a magnetic card; and a method for adequately operating and processing a customer code and the first arithmetic expression and adequately operating and processing an identification code and the second arithmetic expression and thereafter for determining whether both are coincident or not; and the like. It is assumed that such arithmetic expressions for evaluating these identification codes are preset and stored in the ROM 15.

Further, the customer operating portion 20 is provided with an identification code entry ten key keyboard 22 for entering an identification code as well as a clear key C. The display 23 includes a figure number displaying portion for displaying the number of digits of the entered identification code and a determination result displaying portion 232 for displaying the determination result (the result of determining whether a transaction processing is possible or impossible). Further, the customer operating portion 20 is provided with several apertures 26. In the rear side of these apertures 26, a buzzer 24 or piezoelectric vibrator (not shown) is provided for generating sound each time an identification code is entered and/or for warning that more than a predetermined number of erroneous entries has occured occur.

Figure 3:
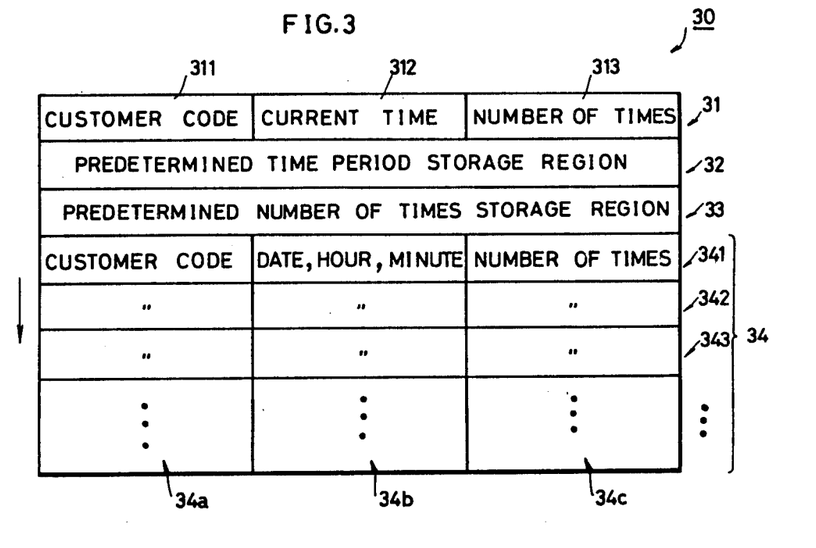
FIG. 3 is a diagram schematically showing storage regions of a random access memory 30 of FIG. 3.
Figure 4:
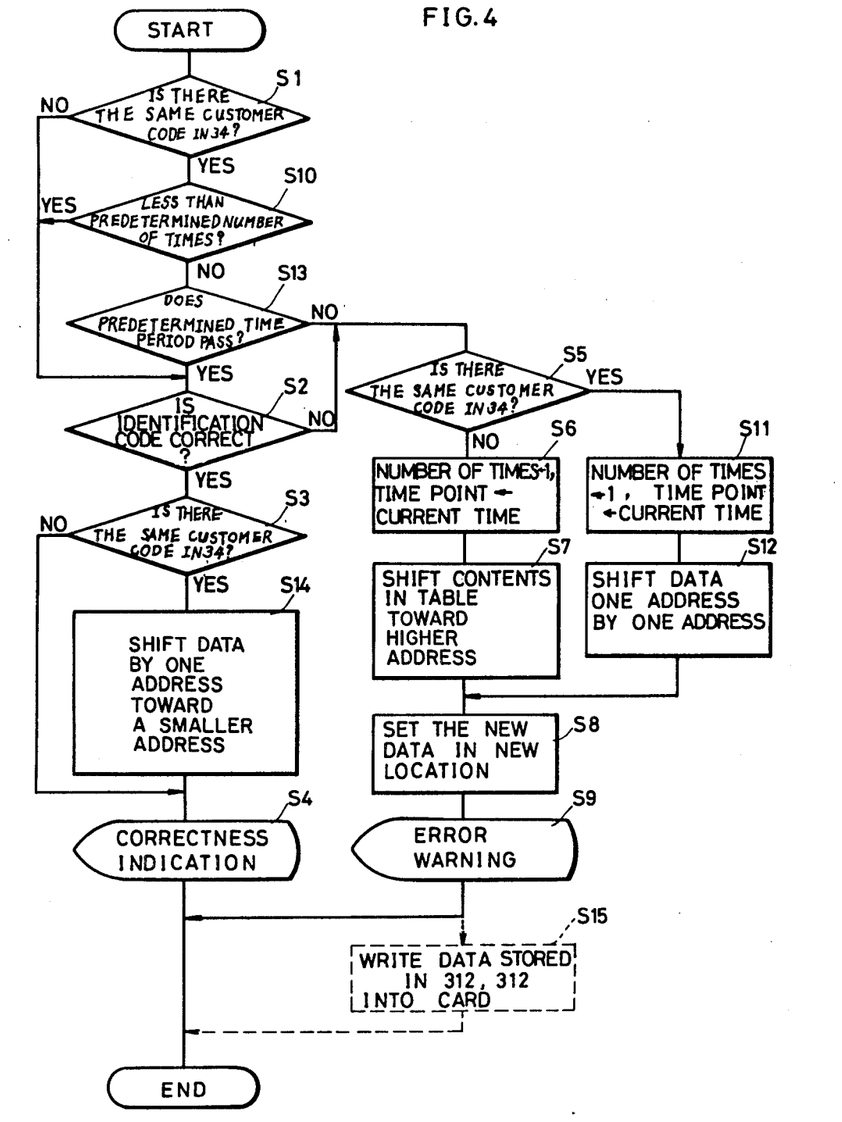
FIG. 4 is a flow chart explaining an operation of one embodiment.

FIG. 3 is a drawing schematically showing storage regions of the RAM 30. In FIG. 3, the RAM 30 includes a buffer region 31 for temporarily storing the data to be compared, a storage region 32 for storing a predetermined time period, a storage region 33 for storing a predetermined number of times and a directory table 34. The buffer region 31 includes a customer code storage area 311 for storing a customer code read from the entered magnetic card, a current time storage area 312 for storing current time and a times storage area 313 for storing the number of times of erroneous entry of the identification code, the number being incremented each time the identification code is entered. The predetermined time period storage region 32 stores a time period that a further identification code entry is to be prohibited from the time point when the most recent erroneously entered identification code is entered in the case that a predetermined number of error identification code entry times occur. This predetermined time period is not known by the customer and may be differently selected depending on users or apparatus in which the identification code determination apparatus of the present invention is used. Preferably, the predetermined time period is set to a time period, for example, two hours, so that when a customer enters his identification code and thereafter notices his error, he can confirm the correct identification code. The predetermined number of times storage region 33 stores the number of times, for example, two times, in which error identification code entries are permitted. The data stored in said predetermined time period storage region 32 and said predetermined number of times storage region 33, respectively, is adapted to be stored in ROM 15 in case that the data is to be fixed. Alternatively, in such a situation, at the time of turning a power source on, the data stored in the ROM 15 may be read out and transferred. Further, such data to be stored in the region 32 and the region 33 may be entered daily.

The directory table 34 includes a plurality of storage area 34l-34n for storing a plurality of addresses, each address storage area comprising a customer storage area 34a, a time point, or day, hour, minute storage area 34b and a storage area 34c for storing the number of erroneous entries. The time point or day, clock and minute when an identification code is erroneously entered is written into the time point storage area 34b for each customer code. An accumulated number of erroneous entry of the identification code during a certain time period, for example, one day is stored in the number of times storage area 34c for each customer code. The directory table 34 includes a predetermined number, for example, a hundred addresses. Therefore, if and when customer's erroneous entries occur more than a predetermined number of times, the data corresponding to the customer code stored first and foremost is erased and subsequent data is sequentially shifted by one address and stored.

FIG. 4 is a flow chart explaining an operation of the embodiment. Referring to FIGS. 1 to 4, a concrete operation of the embodiment will be described in the following.

First, a situation where an identification code is properly entered will be described. Prior to the operation of the flow chart as shown in FIG. 4, a customer inserts his magnetic card into the card inserting slot 25 for scanning the magnetic card. At that time, a card reader 21 reads out the data such as a customer code recorded in the magnetic card and the read out data is provided to CPU 11. The CPU 11 causes the customer code to be stored in the storage area 311 and causes the current time clocked in a timeplace circuit 14 to be stored in the storage area 312. The customer operates the ten key keyboard 22 to enter his identification code. In response to this, the CPU 11 starts the operation of the flow chart as shown in FIG. 4.

In the step 1, (S1) CPU 11 determines in an address sequential manner whether the customer code read out from the magnetic card corresponds to data in the customer code storage area 34a for each address of the directory table 34. If the customer has not erroneously entered his identification code, the program proceeds to the step 2 (S2) since the customer code of the customer is not stored in any customer code storage area (34a) any address of the directory table 34. In the step 2, it is determined whether the identification code (secret number) previously entered corresponds to a predetermined identification code read from the card of the customer. This determination is made by some kind of determination method as described in the foregoing. Now, assuming that it is determined that the identification code is properly entered, the program proceeds to the step 3. In the step 3, it is determined whether the customer code stored in the storage area 311 is stored in the customer code storage area 34a in each address of the directory table 34. If not stored, the program proceeds to in the step 4, wherein a sequential operation is terminated by lighting a display lamp included in said determination result displaying portion 232, the lamp indicating that the operation is normal.

Incidentally, in the step 4, after the indication of correctness, transaction processing is permitted (not shown in the flow chart).

Next, an operation will be described where no erroneous entry of identification code was made at all in the past transactions, and in the present transaction, a predetermined number of erroneous entries occurs for the first time. In this case, in the step 1, upon first entry of an identification code, it is determined that the customer code does not correspond to a customer code stored in the storage area 311 in the directory table 34. In the step 2, it is determined that the identification code is not coincident and thereafter the program proceeds to the step 5 (S5). In the step 5, it is determined that the same customer code as a customer code stored in the storage area 311 does not exist in the directory table 34 and the program proceeds to the step 6. In the step 6, the number of erroneous entries, that is, one, is written into the storage area 313 and the current time clocked by the timepiece 14 is written into the storage area 312. Subsequently, in the step 7, all of the data stored in the directory table 34 is shifted by one address toward a larger address direction. Subsequently, in the step 8, the data stored in the buffer region 31 is transferred to and stored in the first address 341 where the newest data is to be stored. Subsequently, in the step 9, the lamp of the determination result displaying portion 232 indicating erroneous entry is lighted and the buzzer 24 is energized for the purpose of warning the customer. Then, the customer again operates the ten key keyboard 22 to enter his identification code. Correspondingly, in the step 1, it is determined that the same customer code as the customer code stored in the storage area 311 is stored in the first address of the directory table 34 and the program proceeds to the step 10. In the step 10, it is determined whether the number of erroneous entries stored in the times storage area 34c in the first address 34l of the directory table 34 is less than the predetermined number. In case that an identification code is again entered after the first erroneous entry, the program proceeds to the step 2 since the number of erroneous entries is less than the predetermined number. In the step 2, it is determined that the identification code is again erroneous and the program proceeds to the step 5. In the step 5, it is determined that the same customer code is stored in the directory table 34 and the program proceeds to the step 11. In the step 11, the number which was already stored in the storage area 34c in the first address 34l of the directory table 34 is incremented by one and newly stored in the same storage area 34c and the current time at that time is stored in the time point storage area 34b. Thereafter, in the step 12, the data of the current time and the number of erroneous entries for each customer code stored in each address of the directory table 34 is shifted by one address toward a larger address direction. Subsequently, the operations similar to the above described steps 8 and 9 are effected and thereafter the series of operations is terminated.

As described in the foregoing, if and when identification code is erroneously entered more than a predetermined number of times, for example, two times, no check of identification code is made even if the identification code is correctly entered, unless a predetermined time period passes from the time point of the last erroneous entry. In operation of this situation, in step 1, it is determined that the same customer code exists in the directory table 34 and, in the step 10, it is determined that the number of erroneous entries exceeds the predetermined number. Thereafter, the program proceeds to the step 13 for examining the contents stored in the time point storage area 34b at the same address as that of the customer code storage area 34a which stores the same customer code as the customer code stored in the storage area 31l of the buffer region 31. The time point read out of the directory table 34 is subtracted from the current time clocked by the timepiece circuit 14, and it is determined whether the predetermined time period has passed from the time point of error identification code entry. If and when the predetermined time period has already passed, the operations in the above described steps 5, 11, 12, 8, 9 are repeated. Thus, in case of a predetermined number of error identification code entries, even if further identification code entries are made before the predetermined time period passes, no determination of the validity of the identification code is made, but rather, the number of erroneous entries is increased one by one and the current time at that time is newly stored. Accordingly, in case that a person who stole the card makes an attempt to make a transaction by using the card, the number of erroneous entries is incremented and the current time is again stored unless the predetermined time period passes after a predetermined number of erroneous entries. Therefore, even if the correct identification code is entered by accident, no comparison or matching of identification code is made and thus no transaction is permitted. Accordingly, a customer has time after losing his card for noticing that his card was stolen or lost, and thus there is an advantage that an unauthorized transaction using the stolen card can be prevented.

By the way, in case a customer who tries to make a transaction using a magnetic card is the owner of the magnetic card, he may confirm the correct identification code during the inhibit time period. In such a situation, he may again to make a transaction after the predetermined time period expires from the latest time point of erroneous identification code entry. In such a situation, the following operations are made. More particularly, the data is read out of the magnetic card and the identification code is entered by operating the ten key keyboard 22, as described in the foregoing. Then, in step 1, it is determined that the same customer code as a customer code stored in the storage area 31*l* is stored in any of the customer code storage area 34*a* in any address of the directory table 34 and the program proceeds to the step 10. In step 10, the contents stored in the number of times storage area 34*c* corresponding to the address of the customer code storage area is read out and is compared with the contents of the predetermined number of times storage area 33. Then, if and when it is determined that an accumulated number of erroneous entries exceeds the predetermined number, then the program proceeds to the step 13. In the step 13, time point of the most recent erroneous entry stored in the storage area 34*b* in the address corresponding to the address in which the customer code is stored is read out and the read out time point is subtracted from the current time clocked by the time piece circuit 14 to evaluate the time period elapsed. If and when it is determined that the time period elapsed exceeds a predetermined time period, then the program proceeds to step 2. In step 2, it is determined that the identification code now entered is correct, the program proceeds to the step 3. In step 3, it is determined that the same customer code as a customer code stored in the storage area 311 exists in the directory table 34 and the program proceeds to the step 14. In the step 14, the contents in an address subsequent to the address of the same customer code as a customer code stored in the storage area 311 are shifted by one address toward a smaller address and stored therein. As a result, the data of the customer code associated with a correct identification code entered is erased from the directory table 34. Subsequently, in step 4, the correctness is indicated and the series of operations is terminated.

As described in the foregoing, in accordance with the embodiment of the present invention, upon erroneous entry of an identification code, after the record medium is returned to a customer he can be given a chance to confirm his correct identification code. After a predetermined time period, reentry of the identification code is permitted and within the predetermined time period reentry of the identification code is inhibiting, e.g. handled as invalid. Therefore, even if the record medium is stolen, it is possible to have time until the loss of the record medium is reported. In addition, in case that a customer has his own record medium, subsequent processing can be simplified and quickly achieved, compared with conventional apparatus which returns the inserted record medium after a predetermined number of erroneous entries.

Figure 5:
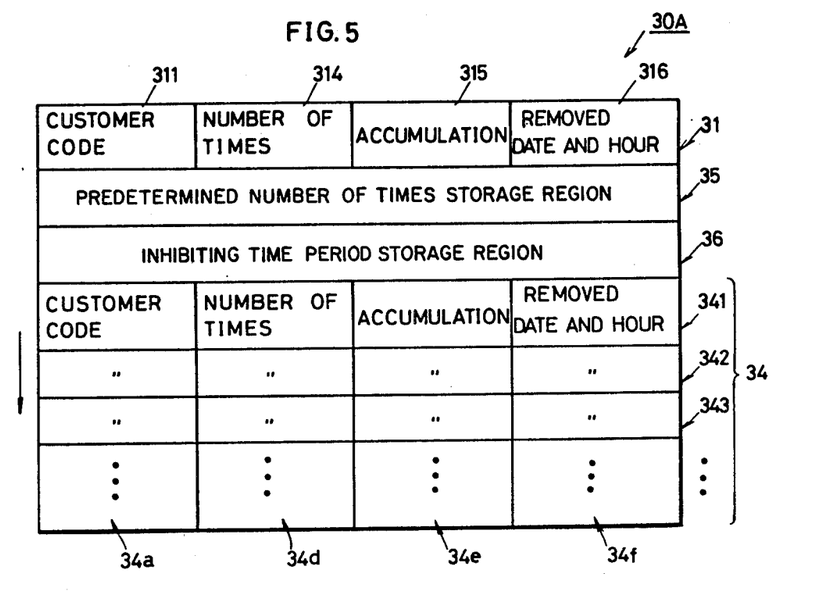
FIG. 5 is a diagram schematically showing storage regions of random access memory 30A used in another embodiment.
Figure 6:
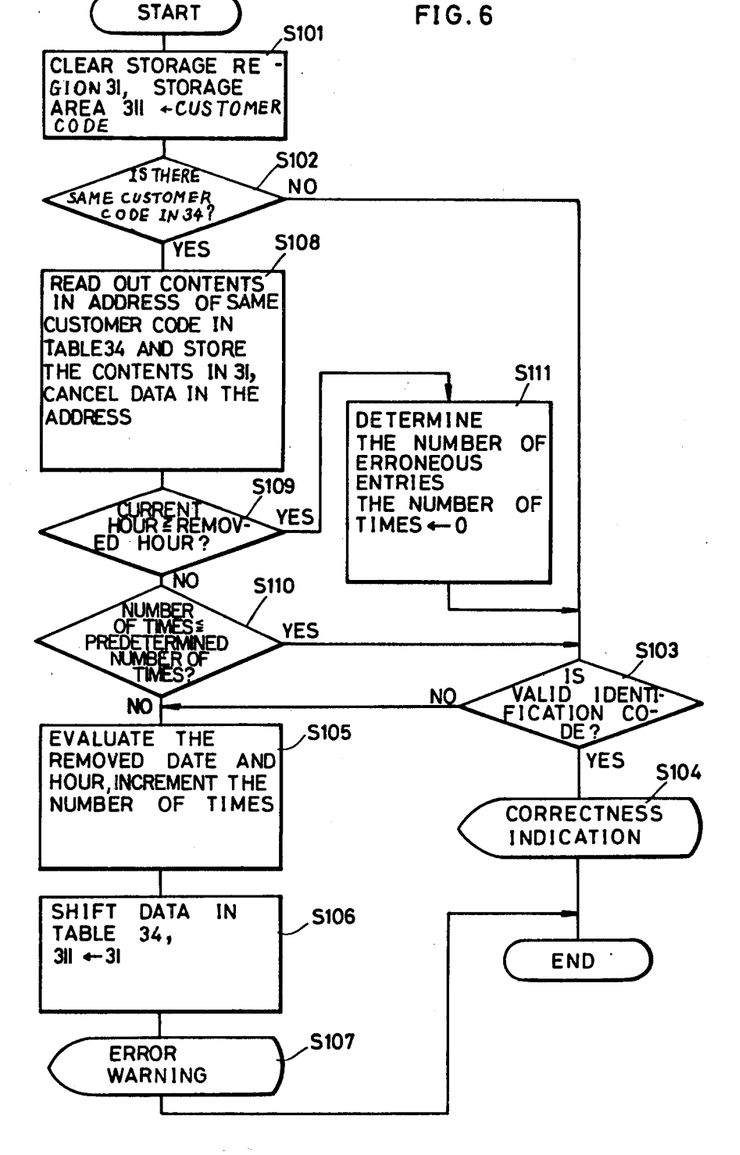
FIG. 6 is a flow chart explaining an operation of another embodiment.

In the following, other embodiments of the present invention will be described. Referring to FIGS. 5 and 6, a second embodiment of the present invention is such that in case that the number of erroneous entries of the identification code is less than a predetermined number, the determination of validity of the card is permitted until the number of error entries reaches the predetermined number, and in case that the number of erroneous entries exceeds the predetermined number, the determination of validity of identification cards is first prohibited during a relatively short time period. Thereafter the time period of prohibiting the determination of validity of identification card is progressively increased as the number of erroneous entries increases.

The embodiment shown in FIGS. 5 and 6 differs from the embodiment as shown in FIG. 4 in that RAM 30A shown in FIG. 5 is used instead of RAM 30 shown in FIG. 1. Further, the second embodiment operates in accordance with a flow chart shown in FIG. 6 instead of the flow chart of FIG. 4.

FIG. 5 is a drawing schematically showning a storage region of RAM 30A used in the second embodiment of the invention. In FIG. 5, RAM 30A includes a buffer region 31 for storing data to be compared, a directory table 34, a storage region 35 for storing a predetermined number of times and a storage region 36 for storing a limit time period.

Said buffer region 31 for storing the data to be compared includes a customer code storage area 311 for storing only one customer code, storage area 314 for storing the number of erroneous entries in a current transaction by the same customer, an accumulated number of times storage area 315 for storing an accumulated number of the same customer's error entries of the identification code, and a removed date and hour storage area 316 for storing the date and hour when the transaction inhibiting is removed. This removed date and hour is defined as the date and hour when the transaction inhibiting time period evaluated based on the accumulated number of erroneous entries passes from the date and hour from the most recent erroneous entry in the predetermined number of times.

The directory table 34 includes storage areas 34*l*–34*n* of a plurality of addresses, each storage area in each address comprising a customer code storage area 34*a*, a storage area 34*d* for storing the number of erroneous entries in the current transaction, an accumulated number of times storage area 34*e* and a removed date and hour storage area 34*f*. These storage areas store the same date as that stored in each storage area included in said buffer region 31. Since the directory table 34 includes a predetermined number, for example, a hundred addresses, for the purpose of convenience of memory capacity, if the number of a customer's erroneous entries exceeds a predetermined number, then the data associated with the oldest one of the customer codes being stored is removed and the subsequent data is shifted by one address and stored therein.

The predetermined number of times storage region 35 is a region for presetting and storing the number, for example twice, where the operation of identification code determination is permitted even if an erroneous identification code is entered. The transaction inhibiting time period storage region 36 is a region for presetting and storing a predetermined time period, the starting time point of the period being the time point of the most recent erroneous entry of the identification code in case of having entered an erroneous identification code a predetermined number of times, during which the determination of validity of identification code subsequently entered is prohibited. This time period is selected to a predetermined, relatively short time period, for example, 15 minutes, and is utilized for evaluating the time point when prohibition of the determination is removed based on the number of erroneous entries. The time period is reported to a customer as necessary. In addition, the time period can be differently selected in accordance with user or the kinds of apparatus in which the identification code determination apparatus of the embodiment is utilized. The information stored in the effective number of times storage region 31 and the time period storage region 32, respectively, may be adapted to be stored in said ROM 15 if the information is to be fixed. Alternatively, in such a situation where the information is preset and stored in the ROM 15, the information is read out upon turning the power source on and transferred to RAM 30 and stored therein.

FIG. 6 is a flow chart explaining the operation of other embodiment. Referring to FIGS. 1, 2, 5 and 6, a specific operation of the second embodiment of the invention will be described.

First, it is assumed that an identification code is correctly entered. Prior to the operation of the flow chart shown in FIG. 6, a customer inserts the magnetic card into the card inserting slot 25 to scan the magnetic card and operates the ten key keyboard 22 to enter his identification code. At this time, a card reader 21 reads out the data such as a customer code recorded in the magnetic card and provides the same to CPU 11. Correspondingly, CPU 11 initiates the operation shown in FIG. 6.

In the step 101 (S101), CPU 11 causes each storage area in said buffer region 31 to be cleared and the customer code read out from the magnetic card to be stored in the storage area 31l. Subsequently, in step 102, CPU 11 determines in an address sequential manner whether the customer code stored in the storage area 31l exists in a storage area 34a of each address in the directory table 34. If and when the customer has not entered an erroneous identification code so far, at that time, the program proceeds to step 103 since the customer code is not stored in any storage area 34a of any address of the directory table 34. In step 103, it is determined whether the identification code now entered corresponds to a predetermined identification code of the customer's. This determination is made by way of many kinds of determination method as described in the foregoing. Now, assuming that it has been determined that the correct identification code is entered, program proceeds to the step 104. In step 104, the correctness indicating lamp included in said determination result displaying portion 232 is lighted and the series of operations is terminated.

Incidentally, in the step 104, after indication of the correctness, a transaction processing is permitted and (not shown in the flow chart).

Next, an operation will be described where no erroneous entry of identification code was made at all in past transaction as far as this particular identification code is concerned, and in the present transaction, a predetermined number of erroneous entries occur at the first time. In this case, in step 102, upon first entry of an identification code, it is determined that the same customer code as a customer code stored in the storage area 311 does not exist in the storage area of each address in the directory table 34. In step 103, it is determined that the identification code does not correspond to the customer's code stored area 311, and thereafter the program proceeds to step 105. In step 105, CPU 11 evaluates the removed date and hour and renews the number of times in this transaction. The removed date and hour is evaluated based on the following equation.

removed date and hour=current date and
hour+time period×(accumulated times +1)

The time period is the time period for inhibiting determination of validity of the card.

More particularly, CPU 11 adds 1 to the accumulated number (initially, 0) stored in the storage area 315, multiplies the value of the result of the addition by the time period stored in the storage region 36 and adds to the product value thereof a current date and hour clocked by said timepiece circuit 14, that is, the current date and time point. For example, when the accumulated number is zero, the number of erroneous entries is within the predetermined number (i.e., two), and the removed date and hour become the date and hour where a time period (for example, 15 minutes) is added to the current date and hour. The removed date and hour (i.e., 15 minutes from the current time) is thus evaluated is stored in the storage area 316. At the same time, CPU 11 adds 1 to the number of erroneous entries in the present transaction stored in the storage area 314 and causes the result thereof to be stored in the storage area 314. Subsequently, in step 106, CPU 11 causes all of the data stored in the directory table 34 to be shifted up one address toward a larger address direction, and thereafter, causes the data stored in each storage area of said buffer region 31 to be stored in each storage area of the first address 341 of the directory table 34. Subsequently, in step 107, CPU 11 causes the correctness indicating lamp in the determination result displaying portion 23b to be lighted and the buzzer 24 to sound for the purpose of warning the customer.

In such a situation, the customer once again inserts the magnetic card into the card inserting slot 25 to scan the card and enters an identification code by operating the ten key keyboard 22 a second time. Correspondingly, CPU 11 effects the same operation as in the above described steps 101 and 102. At that time, since the first erroneous entry has already occurred, CPU 11 determines that the customer code stored in the storage area 311 is stored in the storage area 34a of any address of the directory table 34 and the program proceeds to the step 108. In step 108, CPU 11 reads out the data stored in other storage areas 34d, 34e and 34f corresponding to any address (for example, the first address) of the directory table 34 storing the same customer code as a customer code stored in the storage area 311 and causes the data read out to be stored in the corresponding storage areas 314, 315, 316 of the buffer region 31. In addition, CPU 11 causes the data stored in each address of the directory table 34 to be shifted by one address toward a smaller address direction. Subsequently, in step 109, CPU 11 determines whether the current date and hour clocked by the timepiece circuit 14 exceeds the removed date and hour stored in the storage area 316. At that time, assuming that the second entry of the same customer is made subsequent to the first erroneous entry of his identification code, since the current date and hour does not exceed the removed date and hour, CPU 11 proceeds to step 110. In step 110, CPU 11 compares the number of erroneous entries in the present transaction stored in the storage area 314 with the predetermined number of times stored in the storage region 35 and determines that the number of erroneous entries in the present transaction is less than the predetermined number and the program proceeds to step 103. Then, in step 103, a determination of the validity of the entered identification code is made in a manner similar to the above described operation. At that time, if the correct identification code is entered the second time, the program proceeds to step 104. Contrarily, if the identification code entered the second time is erroneous, the operations of the above described steps 105-107 are repeated.

As described in the foregoing, if the number of erroneous entries of the identification code is less than the predetermined number, the removed date and hour is set to the time point which is a relatively short time period. If the number of successive erroneous entries exceeds the predetermined number, as determined in step 110, the program proceeds to step 105. In this case, the number of erroneous entries in the present transaction is incremented by one for each time an entry operation of the identification code is made, without determining the validity of the entered identification code.

Meanwhile, in case that a customer who tries to make a transaction using a magnetic card is the original owner of the magnetic card, he should notice that he erroneously entered his identification code after several times of erroneous entries of identification code, and he would phone to his family, for example, to determine the correct identification code. In such a situation, he can know the correct identification code relatively earlier. Then, after a inhibiting time period passes, a transaction is made using a magnetic card in a manner similar to the above described operation. In such a case, CPU 11 operates the above described steps 101, 102 and 108, and then, in the step 109, determines that the current date and hour exceeds the removed time point and the program proceeds to step 111. In step 111, CPU 11 adds the number of erroneous entries in the present transaction stored in the storage area 314 to the accumulated number stored in the storage area 315 and causes the result of the addition to be stored in the storage area 315 and thereafter the storage area 314 to be cleared. Subsequently, in the step 103, CPU 11 determines the validity of the entered identification code. At that time, if correct identification code is entered, the fact is determined and the program proceeds to step 104.

However, even if a person makes an attempt to make an unauthorized use of other's magnetic card, it is impossible to find out the correct identification code even after the first removed date and hour have passed. The reason is that since there are ten thousands combination in case of using as a four digit identification code, it is difficult to determine the correct identification code from the ten thousands combinations by trying identification codes within a limited times, the number of times being relatively close to the predetermined number of times. Accordingly, a person who makes an unauthorized use of a magnetic card would erroneously enter the identification code many times. In such a situation, in step 105, since the value 1 is added to an accumulated number of error entries is multiplied by the time period (15 minutes) stored in the storage region 36, the evaluated time period is increased in proportion to the number of erroneous entries and thus the removed date and hour progressively extends from the present time to the future.

Thus, it is clear that since the predetermined number of times is set to a relatively small number and the predetermined time period is set to be relatively short and is variable according to the number of erroneous entries of the identification code, the more a person tries to make an unauthorized use of other's magnetic card, the more the removed date and hour is extended. Thus it is possible to prevent the person from making an unauthorized use of other's magnetic card. In addition, in case that an owner of the magnetic card uses the magnetic card, earlier transaction processing can be made possible because of a shorter waiting time.

Figure 7:
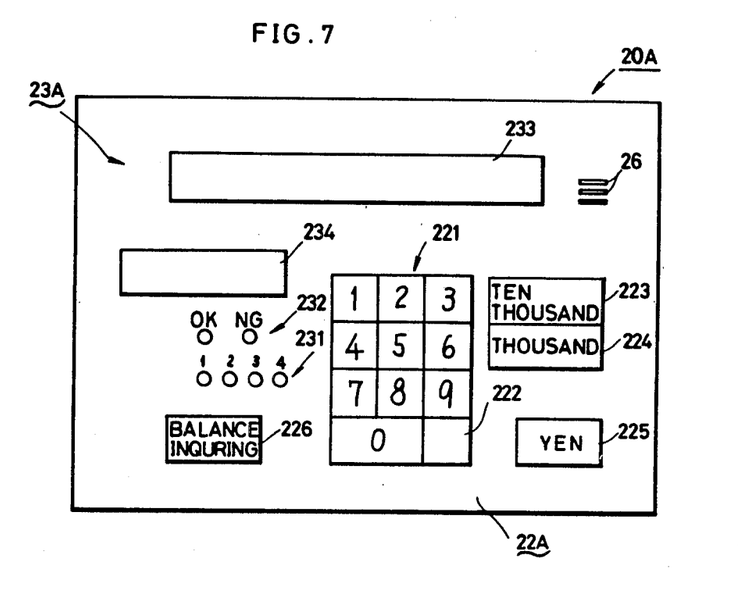
FIG. 7 is a schematic diagram of a customer operating portion 20A used in a further embodiment.
Figure 8:
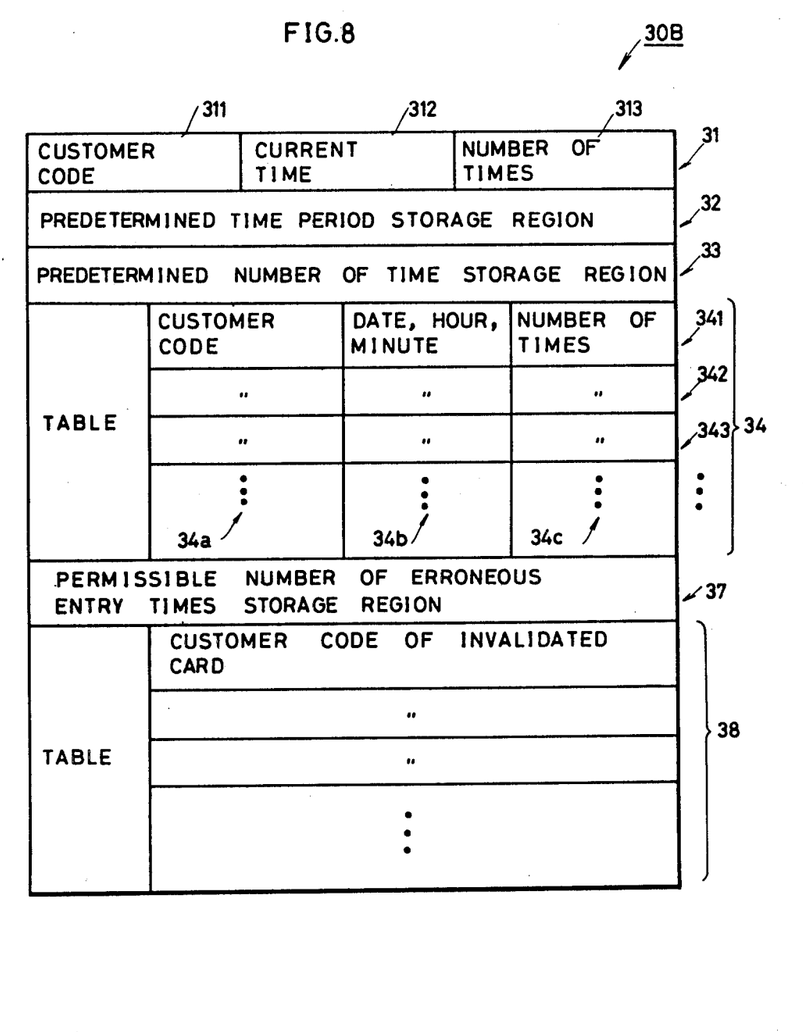
FIG. 8 is a diagram schematically showing the storage regions of random access memory 30B used in a further embodiment.
Figure 9:
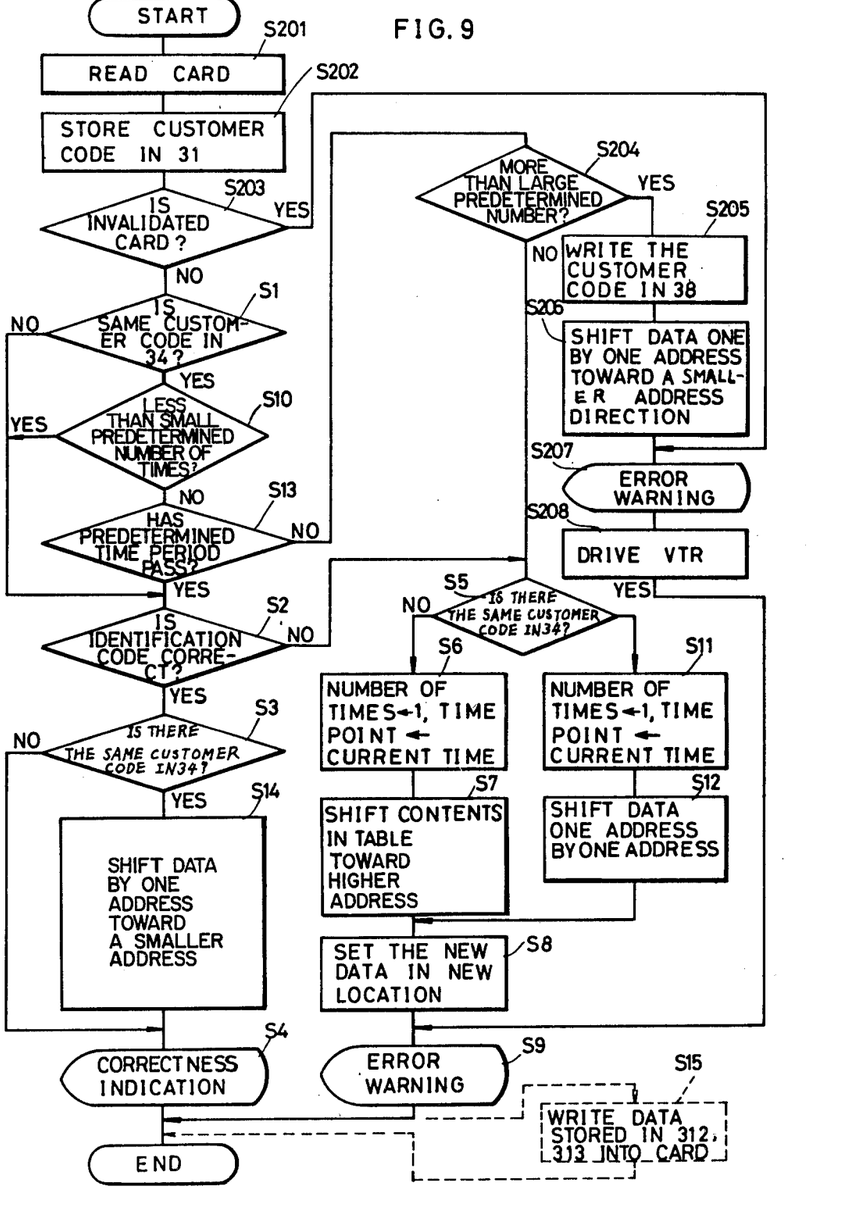
FIG. 9 is a flow chart explaining an operation of the further embodiment.

Now, a further embodiment of the present invention will be described in the following. Referring to FIGS. 7 to 9, the further embodiment of the present invention is adapted to prevent unfair use in case that a transaction processing apparatus is an automatic cash dispenser. More particularly, in accordance with this embodiment, a relatively small predetermined number of erroneous entries of the identification code is permitted and the record medium is returned unless a correct identification code is entered within the predetermined number of times. Thereafter, if and when a transaction is made using the record medium within the predetermined time period, the number of entries is accumulated irrespective of whether the entered identification code is correct or erroneous and the record medium is regarded as an invalid record medium when the accumulated number of entries of the identification code exceeds the relatively large predetermined number, and thus a transaction processing can not be performed even in an available time of the record medium after the predetermined time period passes.

The points where the third embodiment as shown in FIGS. 7 to 9 is different from the embodiment as shown in FIG. 4 are that a customer operating portion 20A shown in FIG. 7 is used instead of the customer operating portion 20, RAM 30B shown in FIG. 8 is used instead of RAM 30, and the third embodiment operates in accordance with a flow chart shown in FIG. 9 instead of a flow chart of FIG. 4. Incidentally, in this embodiment, a bill delivering mechanism 17 and a coin delivering mechanism 18 shown in dotted lines in the block diagram of FIG. 1 are added.

FIG. 7 is a schematic diagram showing a customer operating portion 20A for use in the third embodiment of the invention. A card inserting slot (not shown) is provided in a panel of the customer operating portion 20A or in the vicinity thereof. The card reader 21 is provided in a rear side of said card inserting slot. This card reader 21 reads out the data recorded in a magnetic card when the inserted magnetic card is transported.

A keyboard 22A provided in said customer operating portion 20A includes a ten key keyboard 221 for entering an identification code and the amount claimed to be dispensed, a correction key 222 for commanding correction of a key entered identification code or the amount claimed to be dispensed, a key 223 for designating that the unit of the account claimed to be dispensed is in ten thousands, a key 224 for designating that the unit of the amount is in thousand, a yen key 225 and a balance inquiring key 226.

A display 23A provided in said customer operating portion 20A includes a procedure displaying portion 233 for displaying an operation procedure of the keyboard, an amount displaying portion 234 for displaying the amount claimed to be dispensed, a displaying portion 231 for displaying the number of figures of the entered identification code, and a determination result displaying portion 232 for displaying a determination result (the result of determining whether a transaction processing is possible or impossible).

In addition, several apertures 26 are provided in the customer operating portion 20A, as necessary.

FIG. 8 is a diagram schematically showing the storage region of RAM 30B for use in a further embodiment. In FIG. 8, RAM 30B includes a storage region 37 for storing a predetermined number of which is relatively larger than the predetermined number stored in the region 33 and a directory table 38 for storing invalidated customer codes, in addition to RAM 30 shown in FIG. 3.

The relatively large predetermined number storage region 37 stores the predetermined number of erroneous entries permitted. When the number of erroneous entries reaches the relatively large predetermined number, a customer code recorded in the magnetic card is transferred from the area 311 to a directory table 38 as described subsequently.

The directory table 38 includes a plurality of customer code storage areas and stores the customer code in the card when said accumulated number of entries exceeds the relatively large predetermined number. The magnetic card having the same customer code as a customer code stored in the directory table 38 is invalidated and thereafter transaction processing is invalidated.

FIG. 9 is a flow chart explaining an operation of a third embodiment. Since this flow chart of the embodiment is the same as that of FIG. 4 except for the steps 201-208, identical portions are labelled with identical step numbers.

Now, referring to FIGS. 1 and 7 to 9, a specific operation of this embodiment will be described.

First, it is assumed that an identification code is correctly entered. Prior to explanation of an operation of the flow chart in FIG. 9, a customer inserts a magnetic card into said card inserting slot. Correspondingly, the magnetic card is taken into a cash dispenser by way of an appropriate transporting means and is transported to the point where the card reader 21 is disposed. At that time, a detector switch (not shown) provided in vicinity of the card inserting slot detects insertion of the card. Correspondingly, CPU 11 initiates the operation of the flow chart shown in FIG. 9.

More particularly, in the step 201, data such as a customer code recorded in the magnetic card is read out by the card reader 21. In step 202, the customer code just read out is stored in the storage area 311 in the buffer region 31. In step 203, it is determined that the customer code read out from the magnetic card is stored in the directory table 38. If and when the customer code is not stored in the directory table 38, the program proceeds to step 1 since that magnetic card is valid. In step 1, it is determined whether the customer code read out from the magnetic card is stored in the storage area 34a of any address of the directory table 34. This determination is made for the purpose of determining whether the number of erroneous entries, although it does not reach the permitted relatively large number exceeds the relatively small predetermined number. In such a situation, if and when the customer has not erroneously entered his identification code, the program proceeds to step 2 since the customer code is not stored in any storage area 34a of any address in the directory table 34. In step 2, it is determined whether the entered identification code corresponds to a predetermined identification code of that customer's. This determination is made by way of many kinds of determination method as described in the foregoing. Now, assuming that the identification code is correctly entered, in step 4, a correctness indicating lamp included in said determination result displaying portion 232 is lighted. As a result, a series of operations are terminated in case that the correct identification code is entered.

Incidentally, after the correctness is determined in steps 1 to 4, transaction processing is permitted and the necessary operations for the transaction processing determined based on the kinds of the transaction processing apparatus, the details of which are omitted.

Next, it is assumed that the identification code has not been erroneously entered so far and a relatively small predetermined number of erroneous entries occurs in this transaction. First, in case that the first entry of identification code is effected, the operations in the above described steps 201 to 203 are done and in step 1, it is determined that the same customer code as a customer code stored in the storage area 311 is not stored in the storage area 34a of each address of the directory table 34. Subsequently, in step 2, it is determined that the identification code does not correspond to the customer's code and the program proceeds to step 5. In step 5, it is again determined whether the same customer code as a customer code read out from the magnetic card exists in the directory table 34. In such a situation, the program proceeds to step 6, since the same customer code is not registered in the directory table 34 at the time of the first erroneous entry. In step 6, the number of erroneous entries (initially 1) is written into the storage area 313 and a current time clocked by a timepiece 14 is written into the storage area 312. Subsequently, in step 7, all the data stored in the directory table 34 is shifted by one address toward a larger address direction. In step 8, the data stored in the buffer region 31, that is, a customer code, a current time and the number of entries are stored in the address of the directory table 34, that is the first address, in which the newest data is to be stored. Subsequently, in step 9, the incorrectness indicating lamp of the determination result displaying portion 232 is lighted and the buzzer 24 sounds for warning the customer.

Then, the customer again operates the ten key keyboard 221 and enters his identification code. Correspondingly, the operations as described in steps 201 to 203 are done, and then, in step 1, it is determined that a customer code stored in the storage area 311 is stored in the first address of the directory table 34. Subsequently, in step 10, it is determined whether the number of erroneous entries stored in the storage area 34c is more or less than the relatively small predetermined number. In case that an identification code is again entered after the first erroneous entry, the program proceeds to the step 2 since the number of entry times is less than the relatively small predetermined number. In the step 2, it is determined that the entered identification code is again erroneous. Subsequently, in step 5, it is determined that the same customer code is stored in the directory table 34 and the program proceeds to step 11. In the step 11, data of the same customer code is transferred to the buffer region 31 and 1 is added to the content of the storage area 313 and a current time is written into the storage area 312. Thereafter, in step 12, all the data stored from the newest address (the first address) to the address immediately before the address in which the same customer code is stored, is shifted by one address toward a larger address direction. More particularly, if and when the customer code read out from the magnetic card corresponds to the customer code stored in the directory table 34, the date of the customer code is erased. Thereafter, the same operations as the above described steps 8 and 9 have been done and a series of operations are terminated.

As described in the foregoing, if and when more than a relatively small predetermined erroneous entries are made, a check of the identification code is not made even if a correct identification code is entered unless a predetermined time period passes from the time point of the most recent erroneous entry. In this case, the operations as described in the steps 201, 202, 203 and 204 are done and then, the program proceeds to step 10. In step 10, it is determined that the number of erroneous entries has exceeded the relatively small predetermined number. Subsequently, in step 13, the content of the storage ara 34b of certain addresses of the directory table 34 storing the same customer code as a customer code stored in the storage area 311, is read out. Then, the time point read out from the directory table 34 is subtracted from a current time clocked by the timepiece circuit 14. Subsequently, it is determined whether a predetermined time period passes from the time point of erroneous entry of the identification code. If and when the predetermined time has not passed, the program proceeds to step 204. In step 204, it is determined whether the accumulated number of entry times so far exceeds the relatively large predetermined number. If and when the accumulated number has not exceeded the relatively large number, the operations of the above described steps 5, 11, 12, 8 and 9 are done. Thus, in case that the identification code is erroneously entered within the relatively small predetermined number of times, even if the identification code is further entered many times before the predetermined time period passes, the number of entry times is increased one by one and the current time at that time is newly stored, without further determining validity of entered identification code. Accordingly, in case that an attempt will be made to use a stolen card for transaction processing, a matching of the identification code can not be made and thus transaction processing is not permitted even if the same identification code as the correct identification code is entered by accident after the number of erroneous entries has already exceeded the relatively small predetermined number of times. Therefore, one has sufficient time to report the loss of the card after noticing that the card is stolen or lost, and thus, unfair transaction processing by using a stolen card can be advantageously prevented.

Meanwhile, in the case that a customer tries to make a transaction using a magnetic card is an original owner of the magnetic card, he should go home and confirm the correct identification code. In such a situation, he may again make a transaction after a predetermined time period from the time point of the most recent erroneous entry of the identification code. In such case, the following operations are made.

More particularly, the operations in the above described steps 201 to 204, and 130 are repeated and, in step 13, it is determined that the predetermined time period has passed. Thereafter, in step 2, it is determined that the entered identification code is correct. Subsequently, in step 3, it is determined that the same customer code is stored in the directory table 34. Subsequently, in step 14, all the data stored in the addresses larger than the address in which the above described same customer code is stored in the directory table 34 is shifted by one address toward a smaller address direction and newly stored therein. As a result, the customer code which was previously stored in the directory table 34 due to erroneous entry, as well as the number of erroneous entries and the time point of the most recent erroneous entry are erased. Thereafter, the operation in step 4 is done and then the series of operations is terminated.

Now, an operation in case that the number of erroneous entries exceeds the relatively large number of permitted erroneous entries will be described in the following. If and when, after the relatively small predetermined number of erroneous entries have been made, the accumulated number of entry times exceeds the relatively large number of stored in the relatively large number storage region 37 within a predetermined time period, as is determined in step 204 and the program proceeds to the step 205. In step 205, the customer code is written into a certain address of the table 38. Subsequently, in the step 206, the contents stored in the address larger than the address in which that customer code is stored in the directory table 34, are shifted one address by one address to a smaller address direction. As a result, the data of that customer code is erased from the directory table 34. Thereafter, in steps 207 and/or 208, operations for processing unauthorized use are made, a for example, in the step 207, an alarm is given in a store, without being known by the customer, to tell an occurrence of an invalid card. Alternatively, as another example of processing of the unfair use, shown in step 208, a television camera or a camera disposed in the vicinity of a transaction processing apparatus 10 makes a film of or takes a picture of a person who unfairly uses a magnetic card. Thereafter, in step 9, a series of operations are terminated after giving the alarm to the customer.

As described in the foregoing, in accordance with the embodiment, unfair use of record medium can be advantageously prevented, since when the number of entries within a predetermined time period after more than a relatively small predetermined number of erroneous entries is accumulated and, after the accumulated number exceeds the relatively large predetermined number of erroneous entries, it is determined that the record medium is invalidated and thus necessary processing for preventing unfair use is performed. In addition, in case that an owner of record medium uses the same, subsequent processing can be simplified and no processing of officials in charge is required, compared with an apparatus wherein the record medium is retained in the apparatus upon a predetermined number of erroneous entries.

In the above described embodiments shown in FIGS. 4 and 9, the number of entry times of the identification code and the date, hour and minute of entry time are stored in the random access memory 30 or 30B when the correct identification code is note entered. However, preferably, the number of entry times of the identification code and the date, hour and minute of entry time may be magnetically recorded in a magnetic card. In such a situation, as shown in the step 15 shown in dotted line of FIGS. 4 and 9, the operation step may follow the step 9, wherein the data stored in the storage areas 312 and 313 is recorded in the magnetic card. As a result, in a transaction processing apparatus in the form of off-line system, one can advantageously prevented unfair transaction processings by using another transaction processing apparatus disposed in a different location.

Although the present invention has been described and illustrate in detail, it is clearly understood that the same is by way of illustration and example only and is not to be taken by way of limitation, the spirit and scope of the present invention being limited only by the terms of the appended claims.

What is claimed is:

1. An apparatus for performing a transaction by using a record medium in which at least an identification code is machine readably recorded, comprising:
    means for reading out the identification code recorded in said record medium,
    entry means for entering, by a person seeking to perform a transaction, a secret number which corresponds to the identification code on said record medium,
    means responsive to said secret number and said identification code for determining the validity of the record medium,
    means for storing a first predetermined number corresponding to a number of times that unsuccessful entry attempts of the secret number are permitted,
    storage means having a first storage region for storing a number of unsuccessful entry attempts of the secret number through said entry means and a second storage region for storing the time of the most recent unsuccessful entry attempt,
    means for comparing said number of unsuccessful entry attempts stored in said first storage region of said storage means, with said first predetermined number stored in said storing means for determining whether the number of unsuccessful entry attempts exceeds the first predetermined number, and
    means responsive to determination of said comparing means that the number of unsuccessful entry attempts exceeds the first predetermined number, for disabling and validity determining means during a predetermined time period after the time of the most recent unsuccessful entry attempt stored in said second storage region of the storage means.

2. An apparatus in accordance with claim 1, wherein said storage means includes said first region for storing a number of unsuccessful entry attempts and said second storage region for storing said time of the most recent unsuccessful entry attempt, for each of a plurality of identification codes, respectively.

3. An apparatus in accordance with claim 1, which further comprises
    alarm means operative in response to said means for disabling for alerting said person.

4. An apparatus in accordance with claim 1, which further comprises
    recording means for recording in said recording medium the number of unsuccessful entry attempts stored in said first storage region and the time stored in said second storage region, in response to determination of said determining means that said record medium is not valid.

5. An apparatus in accordance with claim 1, which further comprises
    enabling means for enabling a transaction processing of said transaction processing apparatus, in response to determination of said determining means that said record medium is valid.

6. An apparatus in accordance with claim 1, wherein said record medium is a magnetic recording medium which is able to magnetically record said identification code, and
    said reading means comprises a magnetic card reader having means for reading out the identification code magnetically recorded in said magnetic recording medium.

7. An apparatus in accordance with claim 1, wherein said storage means further includes a third storage region for storing an accumulated number of entry attempts of a secret number through said entry means and a fourth storage region for storing invalid identification codes,
    second means for storing a second predetermined number which is relatively larger than said first predetermined number,
    second means for comparing said accumulated number of entry attempts stored in said third storage region with said second predetermined number stored in said second storing means for determining whether the accumulated number of entry attempts exceeds the second predetermined number, and
    means responsive to determination of said second comparing means that the accumulated number exceeds the second predetermined number for writing the corresponding identification code into said fourth storage region thereby indicating that said corresponding second medium is invalid.

8. An apparatus in accordance with claim 7, which further comprises
    alarm means operative in response to determination of said second comparing means that the record medium is invalid.

9. An apparatus in accordance with claim 1, wherein said predetermined time period for disabling said validity determining means is determined so as to be in proportion to the number of unsuccessful entry attempts stored in the first storage region of said storage means.

* * * * *